United States Patent
Kimura

(10) Patent No.: US 11,542,740 B2
(45) Date of Patent: Jan. 3, 2023

(54) VEHICLE OPENING AND CLOSING BODY CONTROL DEVICE

(71) Applicant: AISIN CORPORATION, Aichi (JP)

(72) Inventor: Shogo Kimura, Kariya (JP)

(73) Assignee: AISIN CORPORATION, Kariya (JP)

( * ) Notice: Subject to any disclaimer, the term of this patent is extended or adjusted under 35 U.S.C. 154(b) by 146 days.

(21) Appl. No.: 16/816,312

(22) Filed: Mar. 12, 2020

(65) Prior Publication Data

US 2020/0291706 A1   Sep. 17, 2020

(30) Foreign Application Priority Data

Mar. 15, 2019  (JP) .............................. JP2019-048209

(51) Int. Cl.
| | |
|---|---|
| *E05F 15/40* | (2015.01) |
| *B60J 5/10* | (2006.01) |
| *E05F 15/43* | (2015.01) |

(52) U.S. Cl.
CPC ............ *E05F 15/40* (2015.01); *B60J 5/10* (2013.01); *E05F 15/43* (2015.01); *E05Y 2400/44* (2013.01); *E05Y 2400/54* (2013.01); *E05Y 2600/46* (2013.01); *E05Y 2900/546* (2013.01)

(58) Field of Classification Search
CPC ................................... E05F 15/40; E05F 15/43
See application file for complete search history.

(56) References Cited

U.S. PATENT DOCUMENTS

| | | | | |
|---|---|---|---|---|
| 7,528,703 | B2 * | 5/2009 | Touge | ...................... B60Q 9/00 |
| | | | | 340/425.5 |
| 7,688,013 | B2 * | 3/2010 | Frommer | ................ E05F 15/43 |
| | | | | 318/466 |
| 7,761,209 | B2 * | 7/2010 | Morris | ...................... E05F 5/06 |
| | | | | 701/49 |

(Continued)

FOREIGN PATENT DOCUMENTS

| | | |
|---|---|---|
| CN | 108350716 A | 7/2018 |
| CN | 108868425 A | 11/2018 |

(Continued)

OTHER PUBLICATIONS

Chinese Office Action dated Aug. 29, 2022, in Chinese Application No. 202010122632.0, 7 pgs.

(Continued)

*Primary Examiner* — Catherine A Kelly
(74) *Attorney, Agent, or Firm* — Oblon, McClelland, Maier & Neustadt, L.L.P.

(57) ABSTRACT

A vehicle opening and closing body control device includes: a control unit configured to control an opening and closing body drive device that drives an opening and closing body of a vehicle, and to cause the opening and closing body to open and close based on an operation request; a detection unit configured to detect an obstacle present around the opening and closing body based on a detection result of an obstacle sensor; and a setting unit configured to set a target stop position that is a position where the opening and closing body is near the obstacle based on a distance from the opening and closing body to the obstacle before operation of the opening and closing body is started. The control unit causes the opening and closing body to stop at the target stop position when the target stop position is set.

7 Claims, 8 Drawing Sheets

(56) References Cited

U.S. PATENT DOCUMENTS

| | | | | |
|---|---|---|---|---|
| 9,007,196 | B2* | 4/2015 | Reed | E05F 15/43 |
| | | | | 340/435 |
| 9,834,175 | B2* | 12/2017 | Tokudome | B60R 25/241 |
| 10,443,290 | B2* | 10/2019 | Tokudome | B60R 25/2036 |
| 10,871,017 | B2* | 12/2020 | Gregory | E05F 15/43 |
| 10,920,478 | B2* | 2/2021 | Conner | B60J 5/101 |
| 11,124,113 | B2* | 9/2021 | Singh | B60R 1/00 |
| 2002/0084675 | A1* | 7/2002 | Buchanan, Jr. | B60J 5/101 |
| | | | | 296/146.8 |
| 2013/0055639 | A1* | 3/2013 | Brosseit | E05F 15/43 |
| | | | | 49/31 |
| 2017/0314318 | A1* | 11/2017 | Hassenpflug | E05F 15/73 |
| 2019/0024430 | A1* | 1/2019 | Jeromin | G06K 9/00805 |

FOREIGN PATENT DOCUMENTS

| | | |
|---|---|---|
| DE | 10 2015 005 361 A1 | 12/2015 |
| FR | 2 936 997 A1 | 4/2010 |
| JP | H 10-018713 | 1/1998 |
| JP | 2009-108556 A | 5/2009 |
| JP | 2012-193580 | 10/2012 |
| JP | 2015229400 | 12/2015 |

OTHER PUBLICATIONS

Japanese Office Action dated in Japanese Patent Application No. 2019-048209 dated Oct. 18, 2022, (w/English translation).

\* cited by examiner

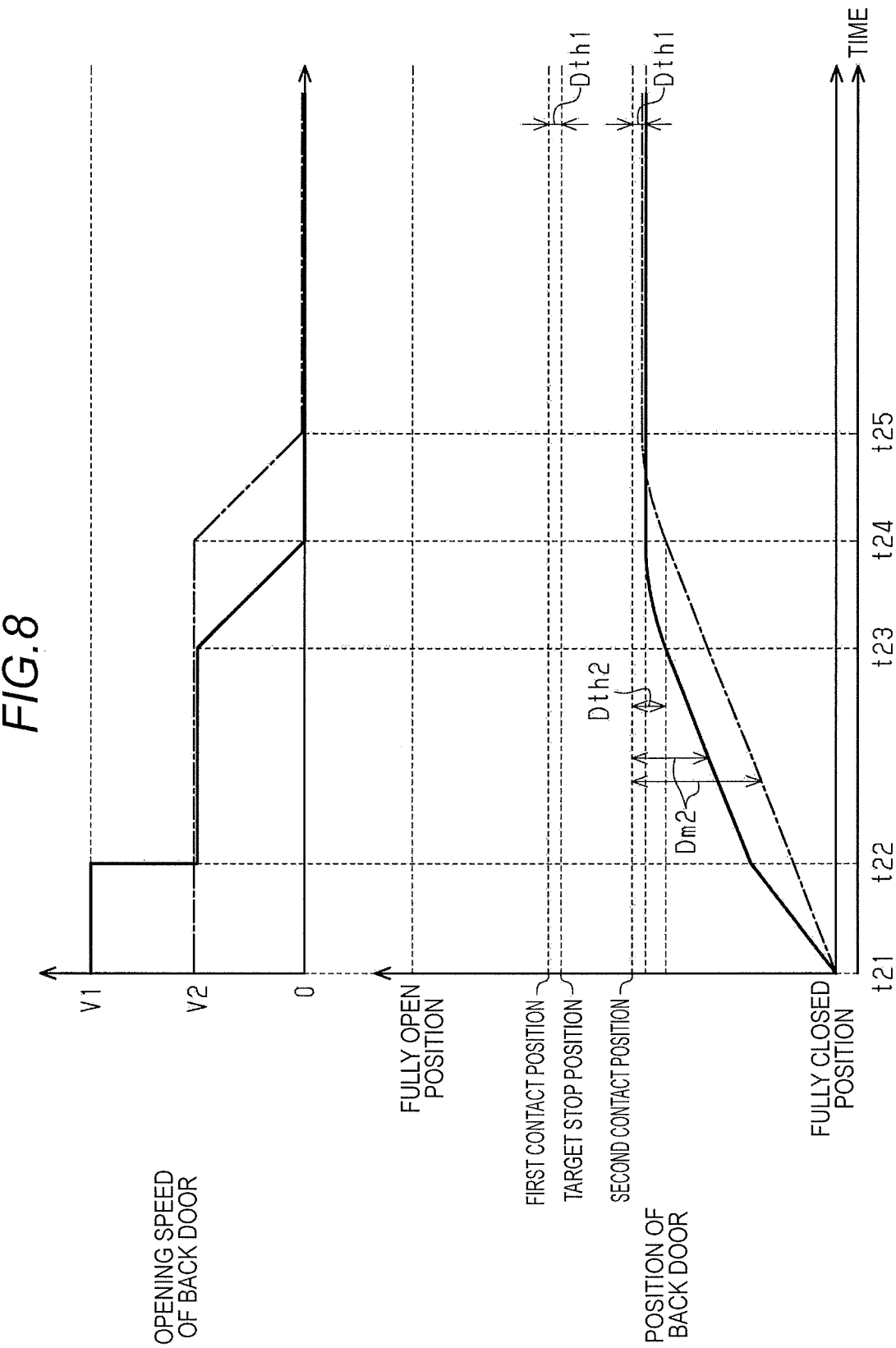

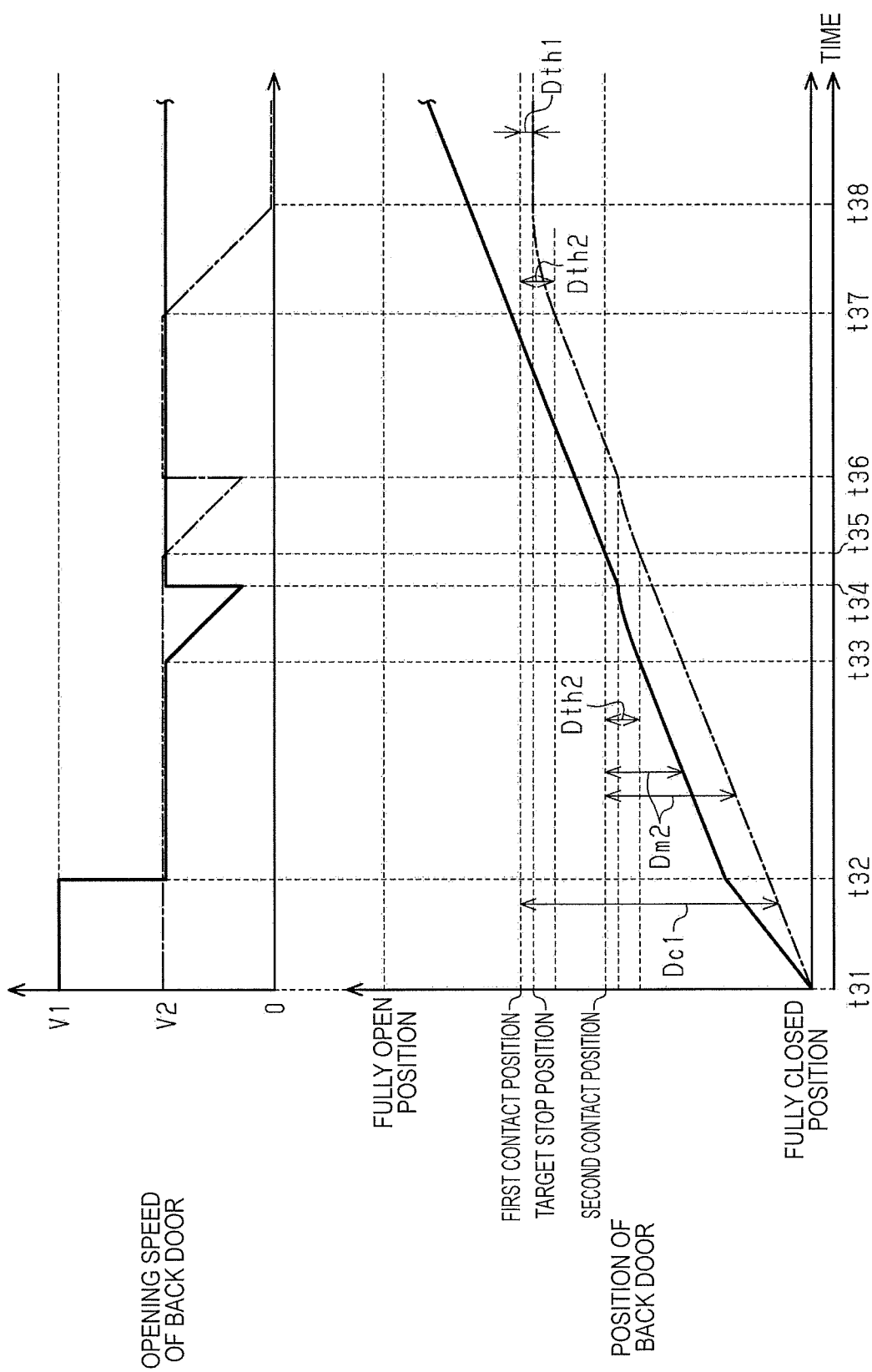

VEHICLE OPENING AND CLOSING BODY CONTROL DEVICE

CROSS REFERENCE TO RELATED APPLICATIONS

This application is based on and claims priority under 35 U.S.C. § 119 to Japanese Patent Application 2019-048209, filed on Mar. 15, 2019, the entire contents of which are incorporated herein by reference.

TECHNICAL FIELD

This disclosure relates to a vehicle opening and closing body control device.

BACKGROUND DISCUSSION

JP-A-2009-108556 (Reference 1) discloses a vehicle including a back door operated by a motor, an obstacle sensor provided on an outer surface of the back door, and a door control device that controls operation of the back door. When the door control device detects by the obstacle sensor that the back door is near an obstacle during opening operation of the back door, the door control device stops the back door. In this way, the door control device prevents the back door from coming into contact with the obstacle.

In the door control device as described above, the obstacle sensor detects a reflected wave of an ultrasonic wave emitted to rear of the back door. Then, the door control device detects presence or absence of an obstacle in rear of the back door based on whether or not the obstacle sensor detects the reflected wave. Therefore, when a positional relationship between the obstacle sensor and the obstacle changes as an opening degree of the back door increases, the obstacle sensor may not be able to detect the reflected wave from the obstacle regardless of the presence of the obstacle in an operation range of the back door. In this case, the door control device may lose sight of the obstacle and the back door to be opened cannot be stopped near the obstacle.

Such an actual situation is not limited to a vehicle including an obstacle sensor using ultrasonic waves, and is generally common to a vehicle including an obstacle sensor whose detection results may change due to external factors such as a surrounding environment in which the vehicle is located. Further, such an actual situation is not limited to a door control device that controls operation of a back door, and is generally common to a vehicle opening and closing body control device that controls operation of an opening and closing body such as a power slide door.

Thus, a need exists for a vehicle opening and closing body control device which are not susceptible to the drawback mentioned above.

SUMMARY

Hereinafter, means for solving the above problems and operational effects thereof will be described.

A vehicle opening and closing body control device according to an aspect of this disclosure includes a control unit configured to control an opening and closing body drive device that drives an opening and closing body of a vehicle to open and close the opening and closing body based on an operation request; a detection unit configured to detect an obstacle present around the opening and closing body based on a detection result of an obstacle sensor; and a setting unit configured to set a target stop position that is a position where the opening and closing body is near the obstacle based on a distance from the opening and closing body to the obstacle before operation of the opening and closing body is started. The control unit causes the opening and closing body to stop at the target stop position when the target stop position is set.

BRIEF DESCRIPTION OF THE DRAWINGS

The foregoing and additional features and characteristics of this disclosure will become more apparent from the following detailed description considered with the reference to the accompanying drawings, wherein:

FIG. 8 is a timing chart illustrating the operation of the door control device; and FIG. 9 is a timing chart illustrating the operation of the door control device.

DETAILED DESCRIPTION

Hereinafter, a vehicle including a vehicle opening and closing body control device will be described with reference to the drawings.

Figure 1:
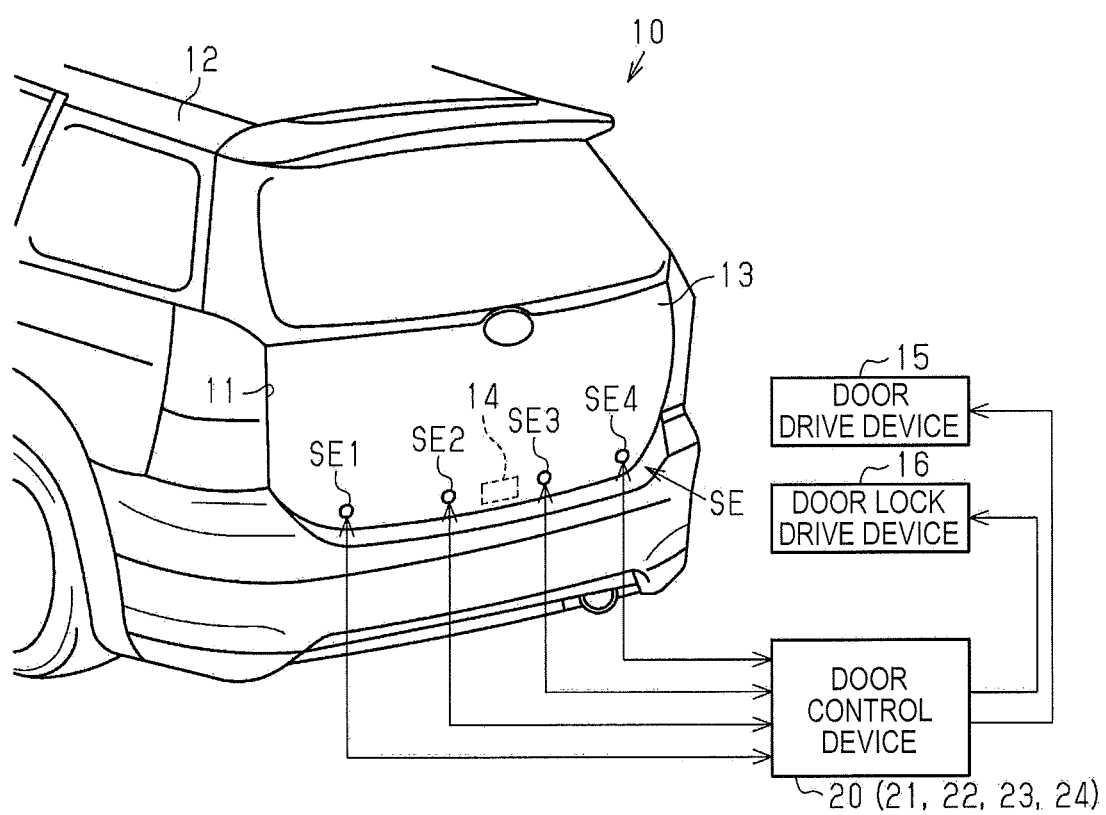
FIG. 1 is a perspective view of a rear portion of a vehicle.

As shown in FIG. 1, a vehicle 10 includes a vehicle body 12 in which a door opening 11 is formed in a rear portion, a back door 13 that opens and closes the door opening 11, and a door lock device 14 that restrains the back door 13 on the vehicle body 12. The vehicle 10 further includes a door drive device 15 that drives the back door 13, a door lock drive device 16 that drives the door lock device 14, and a door control device 20 (controller) that controls the door drive device 15 and the door lock drive device 16.

In the present embodiment, the back door 13 corresponds to an example of an "opening and closing body", the door drive device 15 corresponds to an example of an "opening and closing body drive device", and the door control device 20 corresponds to an example of an "opening and closing body control device".

The door opening 11 opens to rear of the vehicle 10. The door opening 11 has a substantially rectangular shape in which a width direction of the vehicle 10 is a longitudinal direction and an upper-lower direction of the vehicle 10 is a lateral direction. The door opening 11 is an opening for opening a luggage compartment of the vehicle 10 to outside of the vehicle. A weather strip (not shown) is disposed along an opening edge of the door opening 11.

The back door 13 has a shape capable of closing the door opening 11. The back door 13 is rotatably supported on an upper portion of the door opening 11. A rotation axis of the back door 13 extends in the width direction of the vehicle 10. Thus, the back door 13 rotates between a fully closed position where the door opening 11 is fully closed and a fully open position where the door opening 11 is fully opened.

The back door 13 has a plurality of obstacle sensors SE at its lower end portion. In the present embodiment, four obstacle sensors SE1 to SE4 are disposed side by side in the width direction of the vehicle 10. The obstacle sensors SE detect reflected waves of ultrasonic waves transmitted in a direction intersecting an outer surface of the back door 13. When the back door 13 is at the fully closed position, a detection range of the obstacle sensors SE is a region in rear of the back door 13. The obstacle sensors SE preferably have performance of detecting an obstacle 30 that is several cm to several m away. The obstacle 30 in the present embodiment includes a vehicle different from a host vehicle, a wall and a fence such as a building and a garage, and a person and an animal in the vicinity of the vehicle 10.

The door drive device 15 is, for example, an actuator that expands and contracts by driving of a motor (not shown). A base end portion of the door drive device 15 is coupled to the vehicle body 12 and is rotatable about an axial line extending in the width direction of the vehicle 10. A tip end portion of the door drive device 15 is coupled to the back door 13 and is rotatable about an axial line extending in the width direction of the vehicle 10. In this way, the door drive device 15 opens the back door 13 by expansion. On the other hand, the door drive device 15 closes the back door 13 by contraction.

The door lock device 14 is switched between a restraint state in which the back door 13 located at the fully closed position is restrained to the vehicle body 12 and a release state in which the restraint of the back door 13 located at the fully closed position to the vehicle body 12 is released. In the following description, an operation in which the door lock device 14 restrains the back door 13 to the vehicle body 12 from the state in which the back door 13 is not restrained to the vehicle body 12 is also referred to as "latch operation", and an operation in which the door lock device 14 does not restrain the back door 13 to the vehicle body 12 from the state in which the back door 13 is restrained to the vehicle body 12 is also referred to as "unlatch operation". The door lock drive device 16 unlatches the door lock device 14 by driving of a motor (not shown).

Next, the door control device 20 will be described in detail.

The door control device 20 includes a detection unit 21 that detects the obstacle 30 present around the back door 13, a calculation unit 22 that calculates a distance from the back door 13 to the obstacle 30, a setting unit 23 that sets a range in which the back door 13 can be opened, and a control unit 24 that controls the door drive device 15 and the door lock drive device 16.

The detection unit 21 detects the obstacle 30 based on a detection result of an obstacle sensor SE. The detection unit 21 continues acquiring the detection result of the obstacle sensor SE in a predetermined control cycle. For example, the detection unit 21 repeatedly acquires the detection result of the obstacle sensor SE even during opening operation of the back door 13 in addition to before the opening operation of the back door 13 is started.

Figure 2:
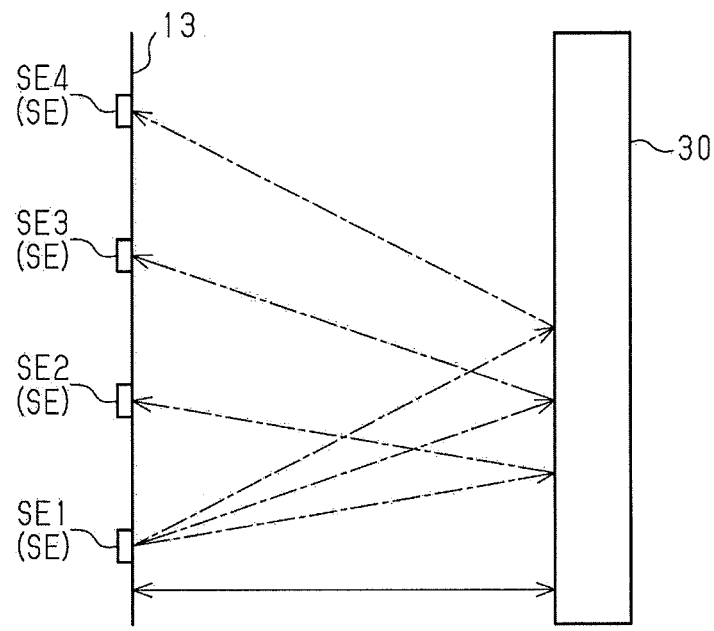
FIG. 2 is a top view illustrating a detection method of an obstacle sensor.

As shown in FIG. 2, the detection unit 21 causes one obstacle sensor SE among the plurality of obstacle sensors SE to function as a transmitter and the other three obstacle sensors SE to function as receivers. Hereinafter, an obstacle detection method when the first obstacle sensor SE1 is set as a transmitter and the second obstacle sensor SE2, the third obstacle sensor SE3, and the fourth obstacle sensor SE4 are set as receivers in a situation where the back door 13 is located at the fully closed position will be described.

When the obstacle 30 is not present in rear of the back door 13, an ultrasonic wave emitted from the first obstacle sensor SE1 is not reflected. That is, the second obstacle sensor SE2, the third obstacle sensor SE3, and the fourth obstacle sensor SE4 do not receive a reflected wave of the ultrasonic wave transmitted from the first obstacle sensor SE1. In this case, based on detection results of the second obstacle sensor SE2, the third obstacle sensor SE3, and the fourth obstacle sensor SE4, the detection unit 21 can detect that the obstacle 30 is not present in rear of the back door 13.

On the other hand, when the obstacle 30 is present in rear of the back door 13, an ultrasonic wave transmitted from the first obstacle sensor SE1 is reflected by the obstacle 30. That is, the second obstacle sensor SE2, the third obstacle sensor SE3, and the fourth obstacle sensor SE4 receive the reflected wave of the ultrasonic wave transmitted from the first obstacle sensor SE1. In this case, based on detection results of the second obstacle sensor SE2, the third obstacle sensor SE3, and the fourth obstacle sensor SE4, the detection unit 21 can detect that the obstacle 30 is present in rear of the back door 13.

As an example, when an intensity of reflected waves received by the second obstacle sensor SE2, the third obstacle sensor SE3, and the fourth obstacle sensor SE4 is equal to or greater than a predetermined threshold, the detection unit 21 may determine that the obstacle 30 is present in rear of the back door 13.

In the obstacle detection method described above, the first obstacle sensor SE1 is the transmitter, the second obstacle sensor SE2, the third obstacle sensor SE3, and the fourth obstacle sensor SE4 are receivers. However, an obstacle sensor SE different from the first obstacle sensor SE1 may be a transmitter, and other obstacle sensors SE may be used as receivers. The detection unit 21 may perform obstacle detection while changing a combination of an obstacle sensor SE serving as a transmitter and obstacle sensors SE serving as receivers. If the obstacle detection is performed by switching the obstacle sensors SE as the transmitter and the receivers, accuracy of the obstacle detection is improved.

In the following description, among obstacles 30 to be detected by the detection unit 21, the obstacle 30 detected before the opening operation of the back door 13 in the fully closed position is started is also referred to as a "first obstacle" and the obstacle 30 detected after the opening operation of the back door 13 is started is also referred to as a "second obstacle".

When the obstacle 30 is detected in rear of the back door 13, the calculation unit 22 calculates the distance from the back door 13 to the obstacle 30. As shown in FIG. 2, when the second obstacle sensor SE2 detects a reflected wave of an ultrasonic wave emitted from the first obstacle sensor SE1, the distance from the back door 13 to the obstacle 30 is calculated according to time from the first obstacle sensor SE1 transmits the ultrasonic wave until the second obstacle sensor SE2 receives the reflected wave. In the present embodiment, "distance from the back door 13 to the obstacle 30", which is indicated by a dimension line in FIG. 2, is a distance in a front-rear direction of the vehicle 10 from an installation location of the obstacle sensor SE in the back door 13 to the obstacle 30. In the following description, the distance from the back door 13 to the obstacle 30 calculated by the calculation unit 22 is also referred to as a "measurement distance".

When the first obstacle is detected in rear of the back door 13, the setting unit 23 sets a "target stop position" which is a position for opening the back door 13 in a range in which the back door 13 would not contact with the first obstacle. The target stop position is a position of the back door 13 when a distance from the back door 13 to the first obstacle is a "first determination distance Dth1" indicating that the back door 13 is near the first obstacle. The target stop position may be geometrically determined based on the distance from the back door 13 to the first obstacle and a rotation radius of the back door 13. The setting unit 23 may manage the target stop position as an opening degree of the back door 13 based on the fully closed position. The first determination distance Dth1 may be a variable appropriately set by a user, or may be a preset fixed value. As an example, the first determination distance Dth1 may be set to a distance of about 50 mm.

When an operation request of the back door 13 is input, the control unit 24 causes the back door 13 to open and close. The operation request is a signal input to the door control device 20 when the user operates a switch provided in the vicinity of a driver seat or on the back door 13 or when the user operates a button provided on an electronic key.

Figure 3:
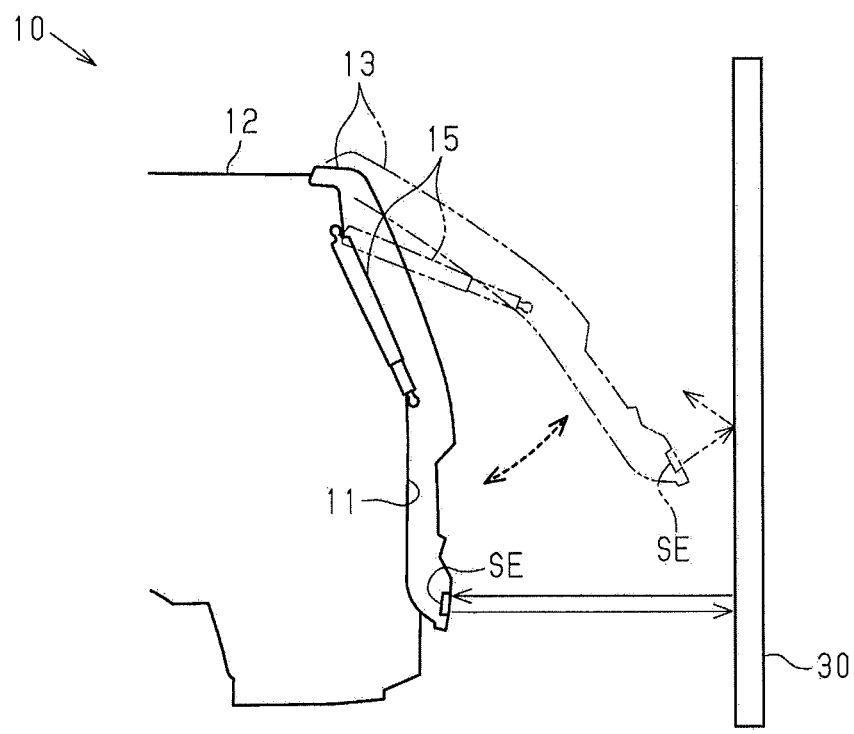
FIG. 3 is a side view illustrating the detection method of the obstacle sensor when an opening degree of a back door is changed.

Here, as shown in FIG. 3, when the detection unit 21 detects the obstacle 30 based on a detection result of an ultrasonic wave reflected by the obstacle 30, the following problem arises. Specifically, as indicated by a solid line in FIG. 3, when the back door 13 is located at a fully closed position, the detection unit 21 can detect the first obstacle based on a detection result of an ultrasonic wave reflected normally. However, as indicated by a two-dot chain line in FIG. 3, when the opening degree of the back door 13 increases, the detection unit 21 may not be able to detect the first obstacle since a reflection direction of the ultrasonic wave does not face the obstacle sensor SE. In other words, the detection unit 21 may lose sight of the first obstacle which can be detected when the opening degree of the back door 13 is small due to increasing of the opening degree of the back door 13.

Therefore, in the present embodiment, when an operation request for opening the back door 13 is input in a situation where the target stop position is set, the control unit 24 causes the back door 13 to open toward the target stop position. Therefore, even if the first obstacle is no longer detected, the control unit 24 can cause the back door 13 to open toward the target stop position which is a position near the first obstacle.

When the second obstacle is detected closer to the back door 13 than the first obstacle while the back door 13 is being opened toward the target stop position, the control unit 24 stops the back door 13 at a position near the second obstacle. Specifically, when a distance from the back door 13 to the second obstacle is equal to the first determination distance Dth1, the control unit 24 stops the back door 13.

On the other hand, when an operation request for opening the back door 13 is input in a situation where the target stop position is not set, the control unit 24 causes the back door 13 to open toward the fully open position. Also in this case, when the second obstacle is detected during the opening operation of the back door 13, the control unit 24 stops the back door 13 at a position near the second obstacle.

Further, the control unit 24 changes an opening speed of the back door 13 as an operation speed depending on whether or not the obstacle 30 is detected. In the present embodiment, the opening speed of the back door 13 is a moving speed of a tip end portion of the back door 13. When the obstacle 30 is not detected, the control unit 24 sets the opening speed of the back door 13 to a relatively high first speed V1. On the other hand, when the obstacle 30 is detected, the control unit 24 sets the opening speed of the back door 13 to a second speed V2 lower than the first speed V1. As an example, the first speed V1 may be 300 to 400 mm/sec and the second speed V2 may be 100 to 200 mm/sec.

Figure 4:
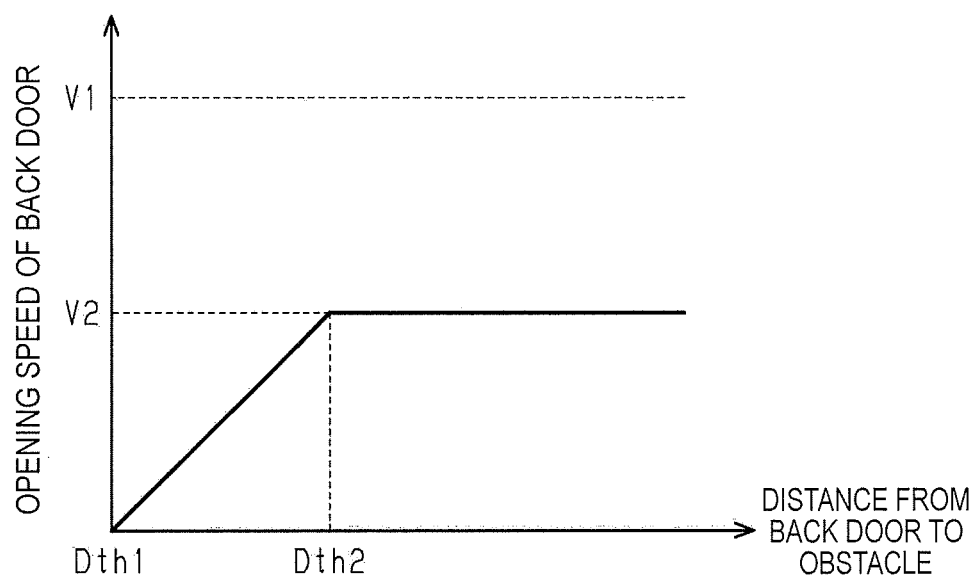
FIG. 4 is a map for setting an opening speed of the back door.

FIG. 4 is a map for setting the opening speed of the back door 13 when the obstacle 30 is detected. In the map shown in FIG. 4, a horizontal axis indicates the distance from the back door 13 to the obstacle 30 and a vertical axis indicates the opening speed of the back door 13. When the distance from the back door 13 to the obstacle 30 is equal to or greater than a second determination distance Dth2, the opening speed of the back door 13 is set to the second speed V2 lower than the first speed V1. When the distance from the back door 13 to the obstacle 30 is less than the second determination distance Dth2, the opening speed of the back door 13 is gradually reduced as the distance decreases.

In the map shown in FIG. 4, when the distance from the back door 13 to the obstacle 30 is the first determination distance Dth1, the opening speed of the back door 13 is "0". However, when the distance from the back door 13 to the obstacle 30 is the first determination distance Dth1, the opening speed of the back door 13 may be less than the second speed V2 and greater than "0". The obstacle 30 mentioned here includes two obstacles 30 of both the first obstacle and the second obstacle. That is, when the first obstacle is detected, the control unit 24 sets the opening speed of the back door 13 to the second speed V2 or less from a timing at which the opening operation of the back door 13 is started. On the other hand, when the second obstacle is detected during the opening operation of the back door 13, the control unit 24 sets the opening speed of the back door 13 to the second speed V2 or less from a timing at which the second obstacle is detected.

Next, a flow of processing executed by the door control device 20 when an operation request for opening the back door 13 is input in a situation where the back door 13 is at the fully closed position will be described with reference to a flowchart shown in FIG. 5.

Figure 5:
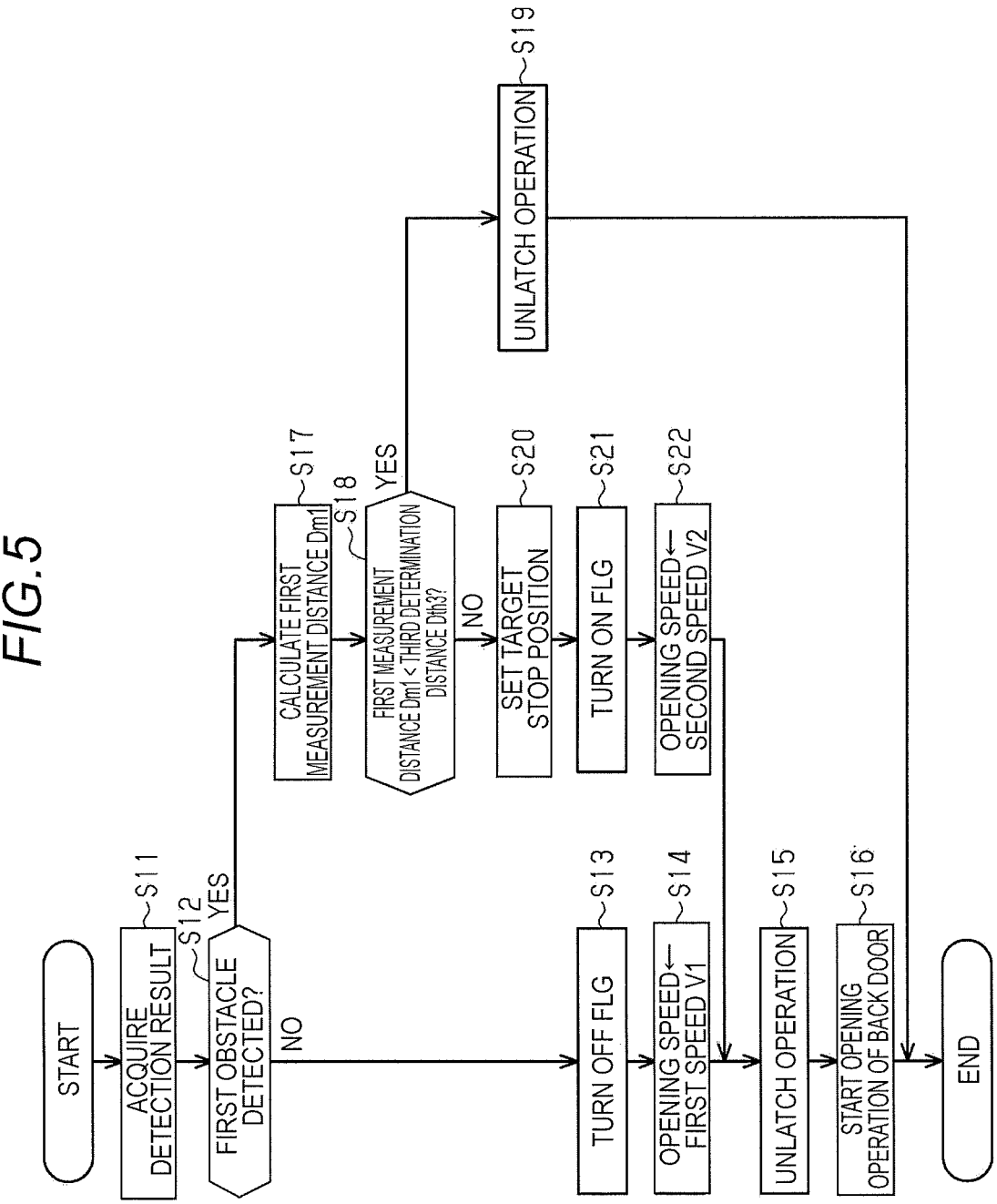
FIG. 5 is a flowchart illustrating a flow of processing executed by a door control device when opening operation of the back door is started.

As shown in FIG. 5, when an operation request for opening the back door 13 is input, the door control device 20 acquires a detection result of an obstacle sensor SE (step S11). Subsequently, based on the detection result of the obstacle sensor SE, the door control device 20 determines whether or not the first obstacle is detected in rear of the back door 13 (step S12). When the first obstacle is not detected (step S12: NO), the door control device 20 turns off a flag FLG (step S13). The flag FLG is a flag indicating whether or not the first obstacle is detected in rear of the back door 13. When the first obstacle is detected in rear of the back door 13, the flag FLG is turned on; when the first obstacle is not detected in rear of the back door 13, the flag FLG is turned off.

After setting the flag FLG, the door control device 20 sets the opening speed of the back door 13 to the relatively high first speed V1 (step S14). Then, the door control device 20 controls the door lock drive device 16 to unlatch the door lock device 14 (step S15). Subsequently, the door control device 20 controls the door drive device 15 to start opening operation of the back door 13 (step S16). Thereafter, the door control device 20 ends the processing.

In step S12, when the first obstacle is detected in rear of the back door 13 (step S12: YES), the door control device 20 calculates a first measurement distance Dm1 which is a measurement distance from the back door 13 to the first obstacle (step S17). Subsequently, the door control device 20 determines whether or not the first measurement distance Dm1 is less than a third determination distance Dth3 (step S18). The third determination distance Dth3 is a distance for determining whether or not the distance from the back door 13 to the first obstacle is short. As an example, the third determination distance Dth3 is set to a length of about 400 mm.

When the first measurement distance Dm1 is less than the third determination distance Dth3 (step S18: YES), the door control device 20 controls the door lock drive device 16 to unlatch the door lock device 14 (step S19). Thereafter, the door control device 20 ends the processing. Here, when the measurement distance is less than the third determination distance Dth3, even if the back door 13 is opened to a target stop position, the opening degree of the back door 13 is limited to an opening degree in which a luggage cannot be taken in and out. Therefore, when it does not make sense to open the back door 13, the door control device 20 restricts the opening operation of the back door 13. On the other hand, for a purpose of notifying the user that an operation request from the user is input, the door control device 20 unlatches the door lock device 14.

When the first measurement distance Dm1 is equal to or greater than the third determination distance Dth3 (step S18: NO), the door control device 20 sets a target stop position for stopping the back door 13 near the first obstacle (step S20). Then, the door control device 20 turns on the flag FLG (step S21) and sets the opening speed of the back door 13 to the relatively low second speed V2 (step S22). After setting the speed of the back door 13, the door control device 20 moves to step S15.

According to the flowchart shown in FIG. 5, even when the first measurement distance Dm1 is equal to or greater than the third determination distance Dth3, and even when the first measurement distance Dm1 is less than the third determination distance Dth3, the door control device 20 unlatches the door lock device 14 (steps S15 and S19). In this regard, it can be said that, when there is an operation request, the door control device 20 releases the restraint of the back door 13 by the door lock device 14 regardless of the first measurement distance Dm1 which is the measurement distance from the back door 13 to the first obstacle.

On the other hand, when the first measurement distance Dm1 is less than the third determination distance Dth3, the door control device 20 restricts the opening operation of the back door 13, and permits opening of the back door 13 when the first measurement distance Dm1 is equal to or greater than the third determination distance Dth3 (step S16). In this regard, it can be said that, when the first measurement distance Dm1 is short, the door control device 20 restricts the opening operation of the back door 13; when the first measurement distance Dm1 is long, the opening operation of the back door 13 is permitted.

Next, a flow of processing executed by the door control device 20 during the opening operation of the back door 13 will be described with reference to a flowchart shown in FIG. 6.

Figure 6:
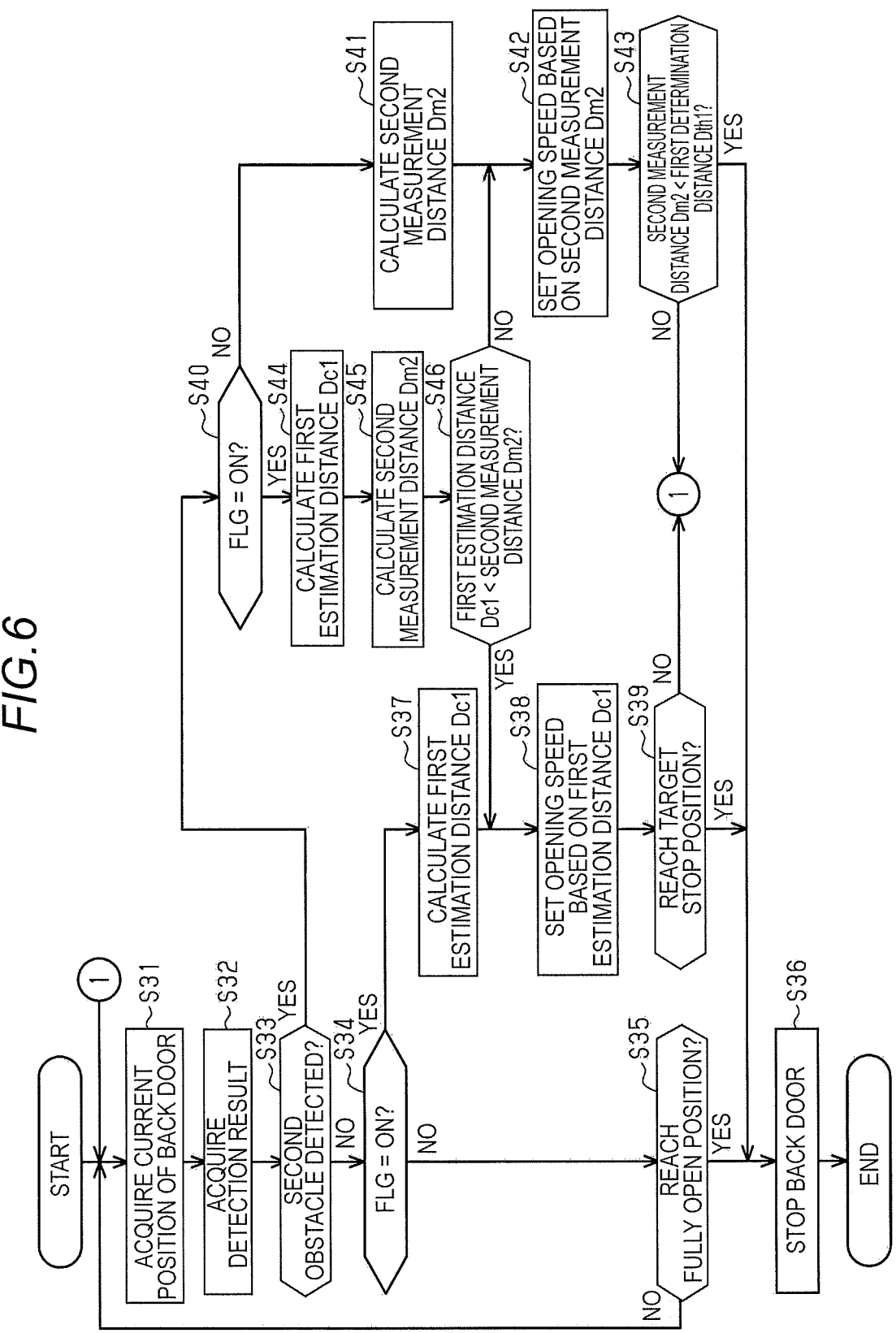
FIG. 6 is a flowchart illustrating a flow of processing executed by the door control device during the opening operation of the back door.

As shown in FIG. 6, the door control device 20 acquires a current position of the back door 13 based on a movement amount of the back door 13 after the opening operation of the back door 13 is started (step S31). Subsequently, the door control device 20 acquires a detection result of an obstacle sensor SE (step S32) and determines whether or not the second obstacle different from the first obstacle is detected in rear of the back door 13 based on the detection result of the obstacle sensor SE (step S33). When the second obstacle is not detected (step S33: NO), the door control device 20 determines whether or not the flag FLG is ON (step S34).

When the flag FLG is OFF (step S34: NO), that is, when the first obstacle is not detected when the opening operation of the back door 13 is started, the door control device 20 determines whether or not the back door 13 reaches the fully open position (step S35). When the back door 13 does not reach the fully open position (step S35: NO), the door control device 20 moves to step S31. On the other hand, when the back door 13 reaches the fully open position (step S35: YES), the door control device 20 controls the door drive device 15 to stop the back door 13 (step S36). Thereafter, the door control device 20 ends the processing.

In step S34, when the flag FLG is ON (step S34: YES), that is, when the first obstacle is detected when the opening operation of the back door 13 is started, the door control device 20, based on the current position of the back door 13, calculates a "first estimation distance Dc1" from the back door 13 to the first obstacle (step S37). The first estimation distance Dc1 is geometrically calculated based on the first measurement distance Dm1 before the operation of the back door 13 is started and the current position of the back door 13.

Then, the door control device 20 sets the opening speed of the back door 13 with reference to the map shown in FIG. 4 (step S38). The distance from the back door 13 to the first obstacle used in setting the opening speed of the back door 13 is not the first measurement distance Dm1 calculated based on the detection result of the obstacle sensor SE but is the first estimation distance Dc1 calculated in step S37. In this way, when the obstacle sensor SE cannot detect the first obstacle, the opening speed is prevented from being set in accordance with the erroneous first measurement distance Dm1.

Then, the door control device 20 determines whether or not the back door 13 reaches the target stop position (step S39). When the back door 13 does not reach the target stop position (step S39: NO), the door control device 20 moves to step S31. On the other hand, when the back door 13 reaches the target stop position (step S39: YES), the door control device 20 moves to step S36.

When the second obstacle is detected in step S33 (step S33: YES), the door control device 20 determines whether or not the flag FLG is ON (step S40). When the flag FLG is OFF (step S40: NO), that is, when the first obstacle is not detected when the opening operation of the back door 13 is started, the door control device 20 calculates a second measurement distance Dm2, which is a measurement distance from the back door 13 to the second obstacle (step S41). Subsequently, the door control device 20 refers to the map shown in FIG. 4, and sets the opening speed of the back door 13 according to the second measurement distance Dm2 (step S42).

Then, the door control device 20 determines whether or not the second measurement distance Dm2 is less than the first determination distance Dth1 (step S43). When the measurement distance from the back door 13 to the second obstacle is equal to or greater than the first determination distance Dth1 (step S43: NO), that is, when the back door 13 is not near the second obstacle, the door control device 20 moves to step S31. On the other hand, when the measurement distance from the back door 13 to the second obstacle is less than the first determination distance Dth1 (step S43: YES), that is, when the back door 13 is near the second obstacle, the door control device 20 moves to step S36.

In step S40, when the flag FLG is ON (step S40: YES), that is, when the first obstacle is detected when the opening operation of the back door 13 is started, the door control device 20 calculates the first estimation distance Dc1 (step S44) and calculates the second measurement distance Dm2 (step S45). Subsequently, the door control device 20 determines whether or not the first estimation distance Dc1 is less than the second measurement distance Dm2 (step S46).

When the first estimation distance Dc1 is less than the second measurement distance Dm2 (step S46: YES), that is, when the first obstacle is located closer than the second obstacle when viewed from the back door 13, the door control device 20 moves to step S38. On the other hand, when the first estimation distance Dc1 is equal to or greater than the second measurement distance Dm2 (step S46: NO), that is, when the second obstacle is located closer than the first obstacle when viewed from the back door 13, the door control device 20 moves to step S42. In this way, with the determination in step S46, an opening speed corresponding to a distance from the back door 13 to the closer obstacle of the first obstacle and the second obstacle is set.

Operations of the present embodiment will be described.

Figure 7:
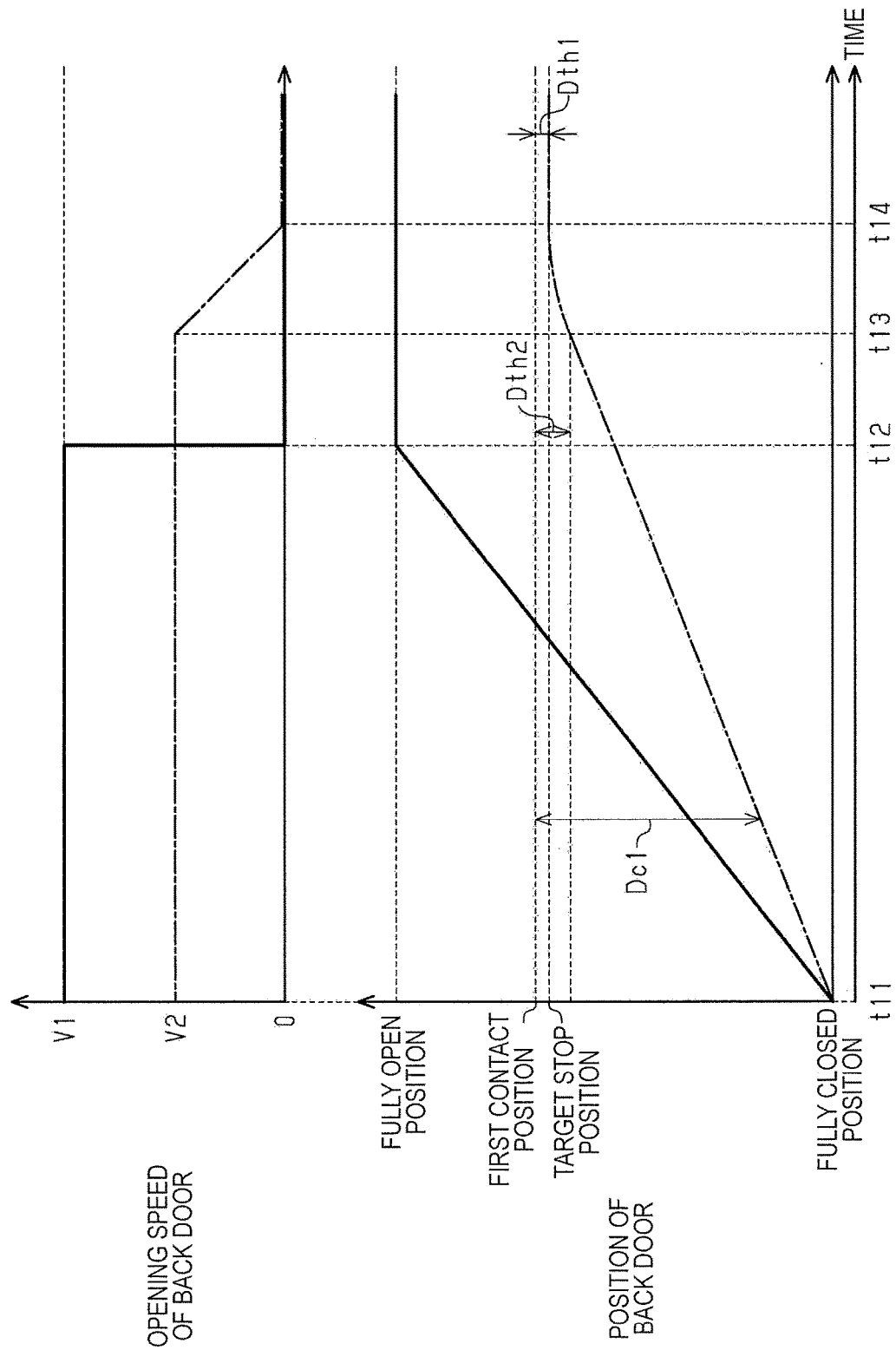
FIG. 7 is a timing chart illustrating operation of the door control device.

Transition of the opening speed of the back door 13 and transition of a position of the back door 13 when the back door 13 is opened from the fully closed position will be described with reference to FIGS. 7 to 9. In FIGS. 7 to 9, a first contact position indicates a position at which the back door 13 is in contact with the first obstacle. In FIGS. 8 and 9, a second contact position indicates a position at which the back door 13 is in contact with the second obstacle. In other words, the first contact position indicates a position of the first obstacle and the second contact position indicates a position of the second obstacle.

In FIG. 7, solid lines indicate a case where the obstacle 30 is not detected before or during the opening operation and dash-dot lines indicate a case where the first obstacle is detected before the opening operation but the second obstacle is not detected during the opening operation.

As indicated by the solid lines in FIG. 7, when the first obstacle is not detected at a first timing t11 in which an operation request of the back door 13 is input, the opening speed of the back door 13 is set to the first speed V1. When the back door 13 starts to be opened at the first timing t11, the back door 13 reaches the fully open position at a second timing t12. Therefore, at the second timing t12, the back door 13 is stopped.

As indicated by the dash-dot lines in FIG. 7, when the first obstacle is detected at the first timing t11 in which the operation request of the back door 13 is input, the opening speed of the back door 13 is set to the second speed V2 lower than the first speed V1. Further, at the first timing t11, a position of the back door 13 that is near the first obstacle by the first determination distance Dth1 is set as the target stop position. Then, when the back door 13 starts to be opened from the first timing t11, the first estimation distance Dc1 is equal to the second determination distance Dth2 at a third timing t13. Therefore, after the third timing t13, the opening speed of the back door 13 gradually decreases as the first estimation distance Dc1 decreases. When a fourth timing t14 at which the back door 13 reaches the target stop position is reached, the back door 13 stops near the first obstacle.

In FIG. 8, solid lines indicate a case where the first obstacle is not detected before the opening operation while the second obstacle is detected during the opening operation, and dash-dot lines indicate a case where the first obstacle is detected before the opening operation and the second obstacle is detected during the opening operation.

As indicated by the solid lines in FIG. 8, when the first obstacle is not detected at a first timing t21 in which an operation request of the back door 13 is input, the opening speed of the back door 13 is set to the first speed V1. Further, the back door 13 starts to be opened from the first timing t21. Then, when a second timing t22 in which the second obstacle is detected is reached, the opening speed of the back door 13 is set to the second speed V2. Subsequently, after a third timing t23 in which the second measurement distance Dm2 is less than the second determination distance Dth2, the opening speed of the back door 13 gradually decreases as the second measurement distance Dm2 becomes shorter. At a fourth timing t24 at which the second measurement distance Dm2 is equal to the first determination distance Dth1, the back door 13 stops at a position near the second obstacle.

As indicated by the dash-dot lines in FIG. 8, when the first obstacle is detected at the first timing t21 in which an operation request of the back door 13 is input, the opening speed of the back door 13 is set to the second speed V2 lower than the first speed V1. Further, at the first timing t21, a position of the back door 13 that is near the first obstacle by the first determination distance Dth1 is set to the target stop position. Further, the back door 13 starts to be opened from the first timing t21. Even when the second timing t22 in which the second obstacle is detected is reached, the opening speed of the back door 13 is maintained at the second speed V2. After the fourth timing t24 in which the second measurement distance Dm2 is less than the second determination distance Dth2, the opening speed of the back door 13 gradually decreases as the second measurement distance Dm2 becomes shorter. When a fifth timing t25 in which the second measurement distance Dm2 is equal to the first determination distance Dth1 is reached, the back door 13 is stopped. That is, the back door 13 stops at a position near the second obstacle instead of the target stop position near the first obstacle.

In FIG. 9, solid lines indicate a case where the first obstacle is not detected before the opening operation while the second obstacle is temporarily detected during the opening operation, and dash-dot lines indicate a case where the first obstacle is detected before the opening operation and the second obstacle is temporarily detected during the opening operation.

As indicated by the solid lines in FIG. 9, when the first obstacle is not detected at a first timing t31 in which an operation request of the back door 13 is input, the opening speed of the back door 13 is set to the first speed V1. The back door 13 starts to be opened from the first timing t31. Then, when a second timing t32 in which the second obstacle is detected is reached, the opening speed of the back door 13 is set to the second speed V2. Subsequently, after a third timing t33 in which the second measurement distance Dm2 is less than the second determination distance Dth2, the opening speed of the back door 13 gradually decreases as the second measurement distance Dm2 becomes shorter. When the second obstacle is no longer detected at a fourth timing t34, the opening speed of the back door 13 is increased to the second speed V2 after the fourth timing t34. Note that, when the second obstacle is temporarily detected during the period from the second timing t32 to the fourth timing t34, for example, an object such as an animal or a ball temporarily passes through a detection region of an obstacle sensor SE.

After the fourth timing t34 at which the opening speed of the back door 13 is equal to the second speed V2, the opening speed of the back door 13 is maintained at the second speed V2. That is, even when the second obstacle is no longer detected, the opening speed of the back door 13 would not increase to the first speed V1. Although not shown in FIG. 9, when the back door 13 reaches the fully open position, the back door 13 is stopped.

As indicated by the dash-dot lines in FIG. 9, when the first obstacle is detected at the first timing t31 in which an operation request of the back door 13 is input, the opening speed of the back door 13 is set to the second speed V2 lower than the first speed V1. Further, at the first timing t31, a position of the back door 13 that is near the first obstacle by the first determination distance Dth1 is set to the target stop position. The back door 13 starts to be opened from the first timing t31. Even when the second timing t32 in which the second obstacle is detected is reached, the opening speed of the back door 13 is maintained at the second speed V2. Subsequently, after a fifth timing t35 in which the second measurement distance Dm2 is less than the second determination distance Dth2, the opening speed of the back door 13 gradually decreases as the second measurement distance Dm2 becomes shorter. When the second obstacle is no longer detected at a sixth timing t36, the opening speed of the back door 13 is increased to the second speed V2 after the sixth timing t36. Then, at a seventh timing t37, the first estimation distance Dc1 is equal to the second determination distance Dth2. Therefore, after the seventh timing t37, the opening speed of the back door 13 gradually decreases as the first estimation distance Dc1 decreases. When the back door 13 reaches an eighth timing t38 at which the back door 13 reaches the target stop position, the back door 13 stops at a position near the first obstacle.

In the fourth timing t34 of the timing chart shown in FIG. 9, it is assumed that the second measurement distance Dm2 from the back door 13 to the second obstacle is longer than the first determination distance Dth1. Similarly, at the sixth timing t36 of the timing chart shown in FIG. 9, it is assumed that the second measurement distance Dm2 from the back door 13 to the second obstacle is longer than the first determination distance Dth1.

Effects of the present embodiment will be described.

(1) As indicated by the solid lines in FIG. 8, when the second obstacle is detected during the opening operation of the back door 13 in the situation where the first obstacle is not detected when the operation request is input, the door control device 20 sets the opening speed of the back door 13 to the second speed V2 that is lower than the first speed V1. Specifically, at the second timing t22 in FIG. 8, the opening speed of the back door 13 is changed from the first speed V1 to the second speed V2. Therefore, during the opening operation of the back door 13, the door control device 20 can increase the number of times of detection of the obstacle sensor SE with respect to a unit movement amount of the back door 13, or shorten a braking distance after trying to stop the back door 13 in operation. Therefore, the door control device 20 can improve positional accuracy when stopping the back door 13 in operation near the second obstacle.

(2) As shown in FIG. 8, when the back door 13 is near the second obstacle, the door control device 20 gradually decreases the opening speed of the back door 13 from the second speed V2 as the distance from the back door 13 to the second obstacle becomes shorter. Specifically, in the case indicated by solid lines in FIG. 8, in the period from the third timing t23 to the fourth timing t24, the opening speed of the back door 13 gradually decreases as the second measurement distance Dm2 becomes shorter. In the case indicated by dash-dot lines in FIG. 8, in the period from the fourth timing t24 to the fifth timing t25, the opening speed of the back door 13 gradually decreases as the second measurement distance Dm2 becomes shorter. Therefore, the door control device 20 can further improve the positional accuracy when the back door 13 in operation is stopped near the obstacle 30.

(3) As shown in FIG. 9, when the second obstacle is no longer detected during the operation of the back door 13, the door control device 20 increases the opening speed of the back door 13 which is set to the second speed V2 or less from a state in which the back door 13 is near the second obstacle. Specifically, in the case indicated by the solid lines in FIG. 9, in the period from the third timing t33 to the fourth timing t34, the opening speed of the back door 13 which is set to the second speed V2 or less is increased at the fourth timing t34. In the case indicated by the dash-dot lines in FIG. 9, in the period from the fifth timing t35 to the sixth timing t36, the opening speed of the back door 13 which is set to the second speed V2 or less is increased at the sixth timing t36. Therefore, when there is no second obstacle, the door control device 20 can promptly operate the back door 13 to a target position.

(4) As indicated by the solid lines in FIG. 9, after the fourth timing t34, the door control device 20 sets an upper limit of the opening speed of the back door 13 to the second speed V2. Therefore, the door control device 20 can again detect the second obstacle.

(5) As indicated by the dash-dot lines in FIG. 7, when the first obstacle is present around the back door 13, the door control device 20 sets the target stop position, which is a position close to the first obstacle, before the operation of the back door 13 is started. Therefore, even when the door control device 20 cannot detect the first obstacle during the operation of the back door 13, the back door 13 is operated to the target stop position. Therefore, even when the first obstacle cannot be detected during the operation of the back door 13, the door control device 20 can stop the back door 13 near the first obstacle.

(6) When the distance from the position where the operation of the back door 13 is started to the obstacle 30 is short, the back door 13 moves only slightly even if the back door 13 is opened to the vicinity of the obstacle 30. That is, in this case, even if the back door 13 is opened, the user cannot put a luggage into or remove a luggage out of the luggage compartment of the vehicle 10. In this regard, the door control device 20 restricts the opening operation of the back door 13 when the distance from the position where the opening operation of the back door 13 is started to the obstacle 30 is short. Specifically, the door control device 20 restricts the opening operation of the back door 13 when the first measurement distance Dm1 is less than the third determination distance Dth3. Therefore, the door control device 20 can restrict the meaningless opening operation of the back door 13.

(7) Even though the user makes an operation request to the door control device 20, when the back door 13 does not operate, the user may feel uncomfortable that the back door 13 does not operate normally. In this regard, even when the distance from the back door 13 to the obstacle 30 is short, the door control device 20 releases the restraint of the back door 13 by the door lock device 14. Therefore, the door control device 20 can respond to the operation request of the user by releasing the restraint of the back door 13, and notify the user that the back door 13 cannot be opened. In this way, the door control device 20 can prevent the user from feeling uncomfortable. Depending on an elastic modulus of a weather strip disposed between the door opening 11 and the back door 13, the back door 13 can be moved slightly together with the release of the restraint of the back door 13 by a restoring force of the weather strip.

(8) As indicated by the dash-dot lines in FIG. 8, even in a situation where the back door 13 is operated toward the target stop position, the door control device 20 stops the back door 13 near the second obstacle when detecting the second obstacle at a position near the target stop position. Therefore, the door control device 20 can prevent the back door 13 from coming into contact with the second obstacle even when the second obstacle appears during the operation of the back door 13.

The present embodiment may be modified and implemented as follows. The present embodiment and the following modifications can be implemented in combination with each other as long as they do not have technical contradiction.

The back door 13 may be another opening and closing body driven by another opening and closing body drive device. For example, other opening and closing body may be a slide door or a swing door that opens and closes the door opening 11 formed on side portions of the vehicle 10, or a sunroof movable panel that opens and closes a roof opening formed in a roof of the vehicle 10. In a case where other opening and closing body is a slide door, the door control device 20 may perform the above-described control in relation to the obstacle 30 that may come into contact with the slide door in a closing operation.

The door control device 20 may perform the above-described control when the back door 13 is not located at a fully closed position. For example, the door control device 20 may perform the above-described control when an operation request for opening the back door 13 is input in a situation where the back door 13 is disposed at a position slightly opened from the fully closed position.

The door drive device 15 may not be an actuator that expands and contracts as long as the back door 13 can be opened and closed. For example, the door drive device 15 may be an actuator that applies torque to a rotation shaft of the back door 13.

The obstacle sensor SE may use light or radio waves instead of ultrasonic waves.

The obstacle sensor SE may be a camera. In this case, the camera may be provided on the back door 13 or be provided on the vehicle body 12. Even when the obstacle sensor SE is constituted by a camera, a detection result of the obstacle sensor SE may not be normal during the opening operation of the back door 13. For example, during the opening operation of the back door 13, raindrops may adhere to a surface of a camera lens or an amount of light incident on the camera may change significantly, which may disturb a camera image. Therefore, even when the obstacle sensor SE is a camera, the effect (5) of the above-described embodiment can be obtained.

The back door 13 may have only one obstacle sensor SE. In this case, reflected waves of ultrasonic waves transmitted by one obstacle sensor SE may be received by the one obstacle sensor SE. The same may be applied to a case where the back door 13 includes a plurality of obstacle sensors SE.

The obstacle sensor SE may be disposed on the back door 13 in a grid shape in both the width direction of the vehicle 10 and the upper-lower direction of the vehicle 10.

The map shown in FIG. 4 may be changed as appropriate. For example, when the distance from the back door 13 to the obstacle 30 is less than the second determination distance Dth2, in accordance with the distance from the back door 13 to the obstacle 30, the opening speed of the back door 13 may be changed in stages; in accordance with the distance from the back door 13 to the obstacle 30, the opening speed of the back door 13 may be changed nonlinearly. The same applies to a case where the distance from the back door 13 to the obstacle 30 is equal to or greater than the second determination distance Dth2.

The door control device 20 may keep the opening speed of the back door 13 constant regardless of the distance from the back door 13 to the obstacle 30. For example, when the obstacle 30 is not detected, the door control device 20 may set the opening speed of the back door 13 to the first speed V1; when the obstacle 30 is detected, the opening speed of the back door 13 may be set to the second speed V2.

When the second obstacle is no longer detected, the door control device 20 may not suddenly change the opening speed of the back door 13 to the second speed V2 but gradually increase it to the second speed V2 as time elapses.

When the second obstacle is no longer detected, the door control device 20 may increase the opening speed of the back door 13 to be higher than the second speed V2. For example, as indicated by solid lines in FIG. 9, after the fourth timing t34, the opening speed of the back door 13 may be increased with the first speed V1 as an upper limit.

When the first measurement distance Dm1 is less than the third determination distance Dth3 (step S18: YES), the door control device 20 may sound an alarm sound together with the unlatch operation. The alarm sound in this case is an alarm sound intended to notify that the back door 13 cannot be opened due to a short distance from the back door 13 to the first obstacle.

When the first measurement distance Dm1 is less than the third determination distance Dth3 (step S18: YES), the door control device 20 may sound an alarm sound instead of the unlatch operation.

A fully open position of the back door 13 may not be a position of the back door 13 when an opening degree of the back door 13 is maximized. For example, the fully open position of the back door 13 may be a memory location set in advance by the user.

The opening speed of the back door 13 may be a rotation speed of the back door 13.

The door control device 20 may be a circuit including one or more processors that operate according to a computer program (software), and one or more dedicated hardware circuits such as dedicated hardware (Application-Specific Integrated Circuit: ASIC) that executes at least a part of the various processing or a combination of the dedicated hardware circuits. The processor includes a CPU and memory such as RAM and ROM, and the memory stores program codes or instructions that cause the CPU to execute processing. The memory, that is, a storage medium, includes any available medium that can be accessed by a general purpose or dedicated computer.

A vehicle opening and closing body control device according to an aspect of this disclosure includes a control unit configured to control an opening and closing body drive device that drives an opening and closing body of a vehicle, and to causes the opening and closing body to open and close based on an operation request; a detection unit configured to detect an obstacle present around the opening and closing body based on a detection result of an obstacle sensor; and a setting unit configured to set a target stop position that is a position where the opening and closing body is near the obstacle based on a distance from the opening and closing body to the obstacle before operation of the opening and closing body is started. The control unit causes the opening and closing body to stop at the target stop position when the target stop position is set.

The vehicle opening and closing body control device having the above configuration sets the target stop position that is a position near the obstacle before operation of the opening and closing body is started when the obstacle is present around the opening and closing body. Therefore, even when the vehicle opening and closing body control device cannot detect the obstacle during the operation of the opening and closing body, the opening and closing body is operated to the target stop position. Therefore, the vehicle opening and closing body control device can stop the opening and closing body near the obstacle even when the obstacle is not detected during the operation of the opening and closing body.

In the vehicle opening and closing body control device, it is preferable that the control unit restricts operation of the opening and closing body when a distance from a position where the operation of the opening and closing body is started to the obstacle is short, and permits the operation of the opening and closing body when the distance is long.

When the distance from the position where the operation of the opening and closing body is started to the obstacle is short, the opening and closing body moves only slightly even if the opening and closing body is operated to approach the obstacle. That is, in this case, there is no meaning for operating the opening and closing body. In this regard, when the distance from the position where the operation of the opening and closing body is started to the obstacle is short, the vehicle opening and closing body control device having the above configuration restricts the operation of the opening and closing body. Therefore, the vehicle opening and closing body control device can restrict the meaningless operation of the opening and closing body.

In the above vehicle opening and closing body control device, it is preferable that the opening and closing body is a back door that opens and closes a door opening formed at a rear portion of a vehicle body; the vehicle includes a door lock device that restrains the back door at a fully closed position at which the door opening is fully closed; and, when the operation request for opening the back door from the fully closed position is provided, the control unit releases the restraint of the back door by the door lock device regardless of the distance from the opening and closing body located at the fully closed position to the obstacle.

Even if a user makes an operation request to the vehicle opening and closing body control device, when the back door is not opened, the user may feel uncomfortable about the back door not opening normally. In this regard, according to the above configuration, even when the distance from the opening and closing body to the obstacle is short, the vehicle opening and closing body control device releases the restraint of the back door by the door lock device. Therefore, the vehicle opening and closing body control device can respond to the operation request of the user by releasing the restraint of the back door and notify the user that the back door cannot be opened. In this way, the vehicle opening and closing body control device can prevent the user from feeling uncomfortable.

In the vehicle opening and closing body control device, it is preferable that, when the obstacle is a first obstacle, the control unit, when a second obstacle different from the first obstacle is detected at a position closer to the opening and closing body than the first obstacle in a situation where the opening and closing body is operated toward the target stop position, causes the opening and closing body to stop at a position where the opening and closing body is near the second obstacle.

The vehicle opening and closing body control device having the above configuration stops the opening and closing body near a second obstacle when the second obstacle is detected at a position near the target stop position even in a situation in which the opening and closing body is operated toward the target stop position. Therefore, the vehicle opening and closing body control device can prevent the opening and closing body from coming into contact with the second obstacle even when the second obstacle appears during the operation of the opening and closing body.

In the vehicle opening and closing body control device, it is preferable that, when the obstacle is not detected, the control unit causes the opening and closing body to open at an opening speed of a first speed, and when the obstacle is detected, the control unit causes the opening and closing body to open at an opening speed of a second speed lower than the first speed.

In the vehicle opening and closing body control device, it is preferable that the control unit restricts operation of the opening and closing body when a distance from a position where the operation of the opening and closing body is started to the obstacle is equal to or less than a first determination distance, and permits the operation of the opening and closing body when the distance is longer than the first determination distance.

A vehicle opening and closing body control device according to another aspect of this disclosure includes a controller. The controller includes control unit configured to control an opening and closing body drive device that drives an opening and closing body of a vehicle, and to cause the opening and closing body to open and close based on an operation request, a detection unit configured to detect an obstacle present around the opening and closing body based on a detection result of an obstacle sensor, and a setting unit configured to set a target stop position that is a position where the opening and closing body is near the obstacle based on a distance from the opening and closing body to the obstacle before operation of the opening and closing body is started. The control unit causes the opening and closing body to stop at the target stop position when the target stop position is set.

The vehicle opening and closing body control device can stop the opening and closing body near an obstacle even when an obstacle sensor cannot detect the obstacle during operation of the opening and closing body.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle opening and closing body control device comprising:
   a control unit configured to control an opening and closing body drive device that drives an opening and closing body of a vehicle to open and close the opening and closing body based on an operation request;

a detection unit configured to detect an obstacle present around the opening and closing body based on a detection result of an obstacle sensor; and a setting unit configured to set a target stop position that is a position where the opening and closing body is adjacent the obstacle based on a distance from the opening and closing body to the obstacle before operation of the opening and closing body is started, wherein the control unit restricts operation of the opening and closing body where a distance from a position when the operation of the opening and closing body is started to the obstacle is less than a predetermined value, and permits the operation of the opening and closing body where the distance is greater than a predetermined distance, and wherein the control unit causes the opening and closing body to stop at the target stop position when the target stop position is set.

2. The vehicle opening and closing body control device according to claim 1, wherein the opening and closing body is a back door that opens and closes a door opening formed at a rear portion of a vehicle body, the vehicle includes a door lock device that restrains the back door at a fully closed position at which the door opening is fully closed, and when the operation request for opening the back door from the fully closed position is provided, the control unit releases the restraint of the back door by the door lock device regardless of the distance from the opening and closing body located at the fully closed position to the obstacle.

3. The vehicle opening and closing body control device according to claim 1, wherein when the obstacle is a first obstacle, the control unit, when a second obstacle different from the first obstacle is detected at a position closer to the opening and closing body than the first obstacle in a situation where the opening and closing body is operated toward the target stop position, causes the opening and closing body to stop at a position where the opening and closing body is adjacent the second obstacle.

4. The vehicle opening and closing body control device according to claim 2, wherein when the obstacle is a first obstacle, the control unit, when a second obstacle different from the first obstacle is detected at a position closer to the opening and closing body than the first obstacle in a situation where the opening and closing body is operated toward the target stop position, causes the opening and closing body to stop at a position where the opening and closing body is adjacent the second obstacle.

5. The vehicle opening and closing body control device according to claim 1, wherein when the obstacle is not detected, the control unit causes the opening and closing body to open at an opening speed of a first speed, and when the obstacle is detected, the control unit causes the opening and closing body to open at an opening speed of a second speed lower than the first speed.

6. The vehicle opening and closing body control device according to claim 1, wherein the control unit restricts operation of the opening and closing body when a distance from a position where the operation of the opening and closing body is started to the obstacle is equal to or less than a first determination distance, and permits the operation of the opening and closing body when the distance is greater than the first determination distance.

7. A vehicle opening and closing control device comprising:

a controller, wherein the controller includes a control unit configured to control an opening and closing body drive device that drives an opening and closing body of a vehicle, and to cause the opening and closing body to open and close based on an operation request, a detection unit configured to detect an obstacle present around the opening and closing body based on a detection result of an obstacle sensor, and a setting unit configured to set a target stop position that is a position where the opening and closing body is adjacent the obstacle based on a distance from the opening and closing body to the obstacle before operation of the opening and closing body is started, and wherein the control unit restricts operation of the opening and closing body where a distance from a position when the operation of the opening and closing body is started to the obstacle is less than a predetermined value, and permits the operation of the opening and closing body where the distance is greater than a predetermined distance, and wherein the control unit causes the opening and closing body to stop at the target stop position when the target stop position is set.

* * * * *